US012689247B2

(12) United States Patent
Han et al.

(10) Patent No.: US 12,689,247 B2
(45) Date of Patent: Jul. 21, 2026

(54) STATOR AND SUCTION MOTOR COMPRISING SAME

(71) Applicant: SAMSUNG ELECTRONICS CO., LTD., Suwon-si (KR)

(72) Inventors: Jihoon Han, Suwon-si (KR); Dongsuk Ko, Suwon-si (KR); Taesang Park, Suwon-si (KR); Woong Hwang, Suwon-si (KR); Younmo Kang, Suwon-si (KR); Jimin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 18/609,233

(22) Filed: Mar. 19, 2024

(65) Prior Publication Data

US 2024/0223026 A1     Jul. 4, 2024

Related U.S. Application Data

(63) Continuation of application No. PCT/KR2022/013181, filed on Sep. 2, 2022.

(30) Foreign Application Priority Data

Nov. 19, 2021     (KR) ........................ 10-2021-0160094

(51) Int. Cl.
*H02K 1/14*          (2006.01)
*H02K 7/14*          (2006.01)
(52) U.S. Cl.
CPC ............... *H02K 1/148* (2013.01); *H02K 1/14* (2013.01); *H02K 1/141* (2013.01); *H02K 7/14* (2013.01)

(58) Field of Classification Search
CPC .......... H02K 1/148; H02K 1/141; H02K 7/14; H02K 1/14; H02K 7/00; H02K 9/06; H02K 1/00; H02K 1/06; A47L 9/22
(Continued)

(56) References Cited

U.S. PATENT DOCUMENTS 6,630,766 B1     10/2003 Kirn et al.
6,919,665 B2 *    7/2005 Murakami ............. H02K 1/148
                                        310/216.043

(Continued)

FOREIGN PATENT DOCUMENTS

CN     202856476 U     4/2013
CN     109412284 A     3/2019
(Continued)

OTHER PUBLICATIONS

Nagai et al, Laminated Core and Its Method of Manufacturing, Oct. 25, 2007, JP 2007282498 (English Machine Translation) (Year: 2007).*
(Continued)

*Primary Examiner* — Alexander A Singh

(74) *Attorney, Agent, or Firm* — STAAS & HALSEY LLP

(57)          ABSTRACT

According to an embodiment of the present disclosure, a stator is formable in a band shape or an annular shape, and includes plurality of element stators adjacently arranged, each element stator of the plurality of element stators including a teeth portion and a body portion disposed at one
(Continued)

end of the teeth portion. The stator includes a plurality of connecting portions, wherein, for adjacent element stators of the plurality of element stators, a respective connecting portion of the plurality of connecting portions connects a first lateral side of a first body portion of a first element stator of the adjacent element stators and a second lateral side of a second body portion of a second element stator of the adjacent element stators, and a recess is formed at a front end of the first lateral side or a front end of the second lateral side.

10 Claims, 18 Drawing Sheets

(58) Field of Classification Search
     USPC ..................................... 310/216.008, 216.088
     See application file for complete search history.

(56)                    References Cited

U.S. PATENT DOCUMENTS

| 8,970,086 B2 | 3/2015 | Jo |
| 9,318,927 B2 | 4/2016 | Kim |
| 9,385,565 B2 | 7/2016 | Okada et al. |
| 2023/0208214 A1 * | 6/2023 | Jang ....................... H02K 15/10 |
| | | 310/216.009 |

FOREIGN PATENT DOCUMENTS

| JP | 2003-324870 | 11/2003 |
| JP | 3674599 | 7/2005 |
| JP | 2007-37317 | 2/2007 |
| JP | 2007282498 A * | 10/2007 |
| JP | 4349831 | 10/2009 |
| JP | 4611272 | 1/2011 |
| JP | 5055020 | 10/2012 |
| JP | 5390869 | 1/2014 |
| JP | 5505661 | 5/2014 |
| KR | 10-0975993 | 8/2010 |
| KR | 10-1063684 | 9/2011 |
| KR | 10-2013-0033668 | 4/2013 |
| KR | 10-2013-0060239 | 6/2013 |
| WO | WO 2013/136485 A1 | 9/2013 |

OTHER PUBLICATIONS

International Search Report, PCT/ISA/210, dated Dec. 16, 2022, in Patent Application No. PCT/KR2022/013181.
Written Opinion, PCT/ISA/237, issued on Dec. 16, 2022, in Patent Application No. PCT/KR2022/013181.
Office Action dated Sep. 29, 2025, in Korean Patent Application No. 10-2021-0160094.

* cited by examiner

Proportion of Fourth Section to Thickness of Body Portion (%)

STATOR AND SUCTION MOTOR COMPRISING SAME

CROSS-REFERENCE TO RELATED APPLICATIONS

This application is a continuation of International Application No. PCT/KR2022/013181, filed Sep. 2, 2022, and claims foreign priority to Korean application No. 10-2021-0160094, filed Nov. 19, 2021, which are incorporated herein by reference in their entireties.

TECHNICAL FIELD

Various embodiments of the disclosure relate to a motor and a suction motor including the same.

BACKGROUND ART

Recently, a so-called stick-type vacuum cleaner (or cordless vacuum cleaner) is attracting attention, in which components such as a cleaner main body, a hose, an electric cord or the like are omitted. Such a stick-type vacuum cleaner is equipped with a relatively small fan for reasons such as reduced weight and miniaturization. In order for the stick-type vacuum cleaner to generate high suction force, it is typically required a driving motor (mini fan motor) capable of realizing a high-speed rotation of 50,000 rev/min or more and even an ultra-high-speed rotation of 100,000 rev/min or more while securing a certain amount of torque.

Such mini fan motors generate noise due to high-speed rotation. In particular, when a frequency generated by the rotation of the mini fan motor overlaps a natural frequency of the stator making up the mini fan motor, it generates more noise due to resonance. For the purpose of eliminating this resonance noise, the mini fan motors may be designed such that the natural frequency of the stator does not overlap the frequency generated by driving the mini fan motor. However, in order to adjust the natural frequency of the stator, it is necessary to adjust the thickness of a body portion (or yoke) of the stator, and therefore, there is a problem that if a body portion of the stator is made thicker, a total weight of the stick-type vacuum cleaner increases, and if the body portion of the stator is made thinner, a magnetic saturation may occur electromagnetically.

DETAILED DESCRIPTION OF THE INVENTION

Technical Solution

Various embodiments of the disclosure provide a stator capable of designing a natural frequency for avoiding occurrence of resonance without adjusting a thickness of the stator of a suction motor.

According to various embodiments of the disclosure, stator may be formable in a band shape or an annular shape, and the stator may include a plurality of element stators adjacently arranged, each element stator of the plurality of element stators including a teeth portion and a body portion disposed at one end of the teeth portion. Further, the stator may include a plurality of connecting portions, wherein, for adjacent element stators of the plurality of element stators, a respective connecting portion of the plurality of connecting portions connects a first lateral side of a first body portion of a first element stator of the adjacent element stators and a second lateral side of a second body portion of a second element stator of the adjacent element stators, and a recess is formed at a front end of the first lateral side or a front end of the second lateral side.

According to various embodiments of the disclosure, when the stator is formed in the annular shape, the respective connecting portion is bent such that the first lateral side and the second lateral side face each other, and the teeth portion of each element stator faces inwardly.

According to various embodiments of the disclosure, a space is formed inside the respective connecting portion, and in case that the respective connecting portion is bent such that the first lateral side and the second lateral side face each other to form the stator in the annular shape, the first lateral side and the second lateral side are in contact with each other in a portion between the space and the recess.

According to various embodiments of the disclosure, in case that the respective connecting portion is bent such that the first lateral side and the second lateral side face each other to form the stator in the annular shape, a radial depth of the recess is greater than 25% of a radial width of the first body portion or the second body portion.

According to various embodiments of the disclosure, the first lateral side includes a contact protrusion protruding between the respective connecting portion and the front end of the first lateral side, and the second lateral side includes a contact recess allowing the contact protrusion to be inserted into a position corresponding to the contact protrusion.

According to various embodiments of the disclosure, in case that the respective connecting portion is bent such that the first lateral side and the second lateral side face each other to form the stator in the annular shape, the first lateral side and the second lateral side are in contact with only a portion of the contact protrusion and a portion of the contact recess.

According to various embodiments of the disclosure, a length of the contact protrusion protruding in a direction perpendicular to the first lateral side is longer than a length of the contact recess recessed in a direction perpendicular to the second lateral side, and/or a radial length of a cross section of the contact protrusion on the first lateral side is shorter than a radial length of a cross section of the contact recess on the second lateral side.

According to various embodiments of the disclosure, in case that the respective connecting portion is bent such that the first lateral side and the second lateral side face each other to form the stator in the annular shape, a length between a portion where the contact protrusion comes into contact with the contact recess and the front end of the first lateral side or the second lateral side is greater than 25% of a radial width of the first body portion or the second body portion.

According to various embodiments of the disclosure, a suction motor may include a stator having an annular shape and including a plurality of element stators adjacently arranged, each element stator of the plurality of element stators including a teeth portion and a body portion disposed at one end of the teeth portion, and a plurality of connecting portions, wherein, for adjacent element stators of the plurality of element stators, a respective connecting portion of the plurality of connecting portions connects a first lateral side of a first body portion of a first element stator of the adjacent element stators and a second lateral side of a second body portion of a second element stator of the adjacent element stators, and, a recess is formed at a front end of the first lateral side or a front end of the second lateral side, The suction motor may further include a rotor rotatably disposed in the stator with the teeth portion of each element stator of the plurality of element stators protruding toward the rotor, a rotation shaft passing through a rotation axis of the rotor so as to be rotatable together with the rotor; and an impeller connected to the rotation shaft.

According to various embodiments of the disclosure, the respective connecting portion is bent such that the first lateral side and the second lateral side face each other, and a radial depth of the recess is greater than 25% of a radial width of the first body portion or the second body portion.

According to various embodiments of the disclosure, the first lateral side includes a contact protrusion protruding between the respective connecting portion and the front end of the first lateral side, and the second lateral side includes a contact recess allowing the contact protrusion to be inserted into a position corresponding to the contact protrusion.

According to various embodiments of the disclosure, a length of the contact protrusion protruding in a direction perpendicular to the first lateral side is longer than a length of the contact recess recessed in a direction perpendicular to the second lateral side, and/or a radial length of a cross section of the contact protrusion on the first lateral side is shorter than a radial length of a cross section of the contact recess on the second lateral side.

According to various embodiments of the disclosure, the respective connecting portion is bent such that the first lateral side and the second lateral side face each other, and a length between a portion where the contact protrusion comes into contact with the contact recess and the front end of the first lateral side or the second lateral side is greater than 25% of a radial width of the first body portion or the second body portion.

According to various embodiments of the disclosure, a vacuum cleaner may include a cleaner main body, a suction head configured to suck foreign substances on a surface to be cleaned into the cleaner main body, and a suction motor according to an embodiment of the disclosure.

MODE FOR CARRYING OUT THE INVENTION

Figure 1:
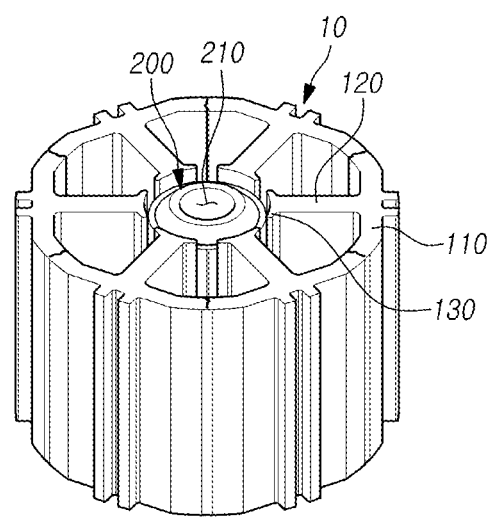
FIG. 1 is a perspective view of a stator and a rotor according to an embodiment of the disclosure.

Hereinafter, various embodiments will be described in detail with reference to the accompanying drawings. In the following description, specific details such as detailed configurations and components will be provided only to help a general understanding of embodiments of the disclosure. Therefore, it would be apparent to those skilled in the art that various changes and modifications may be made without departing from the scope and spirit of the disclosure. Further, descriptions of well-known features and configurations may be omitted for clarity and brevity.

Like reference numerals or signs for each of the drawings of the present specification represent parts or components that perform substantially the same functions.

Further, the terms used herein are used to describe the embodiments and are not intended to limit and/or restrict the disclosed invention. A singular expression includes a plural expression, unless the context clearly dictates otherwise. Throughout this specification, the terms "include(s)", "comprise(s)" or "have/has" are intended to designate the presence of the features, numbers, steps, operations, components, parts, or combinations thereof described herein, and do not preclude the possibility of the presence or addition of one or more other features, numbers, steps, operations, components, parts, or combinations thereof.

In addition, the terms including ordinal numbers such as "first", "second" and the like as used herein may be used to describe various components, but the components are not limited by such terms, and the terms are used only to distinguish one component from another. For example, without departing from the scope of the present invention, a first component may be referred to as a second component, and similarly, a second component may be referred to as a first component. The term "and/or" includes a combination of a plurality of related described items or any one of a plurality of related described items.

Meanwhile, as used in the following description, the terms "upper side", "lower side", "front-to-back direction" or the like are defined with respect to the drawings and are not intended to limit the shape and position of each component.

Hereinafter, embodiments of the present invention will be described in detail with reference to the accompanying drawings.

Figure 2:
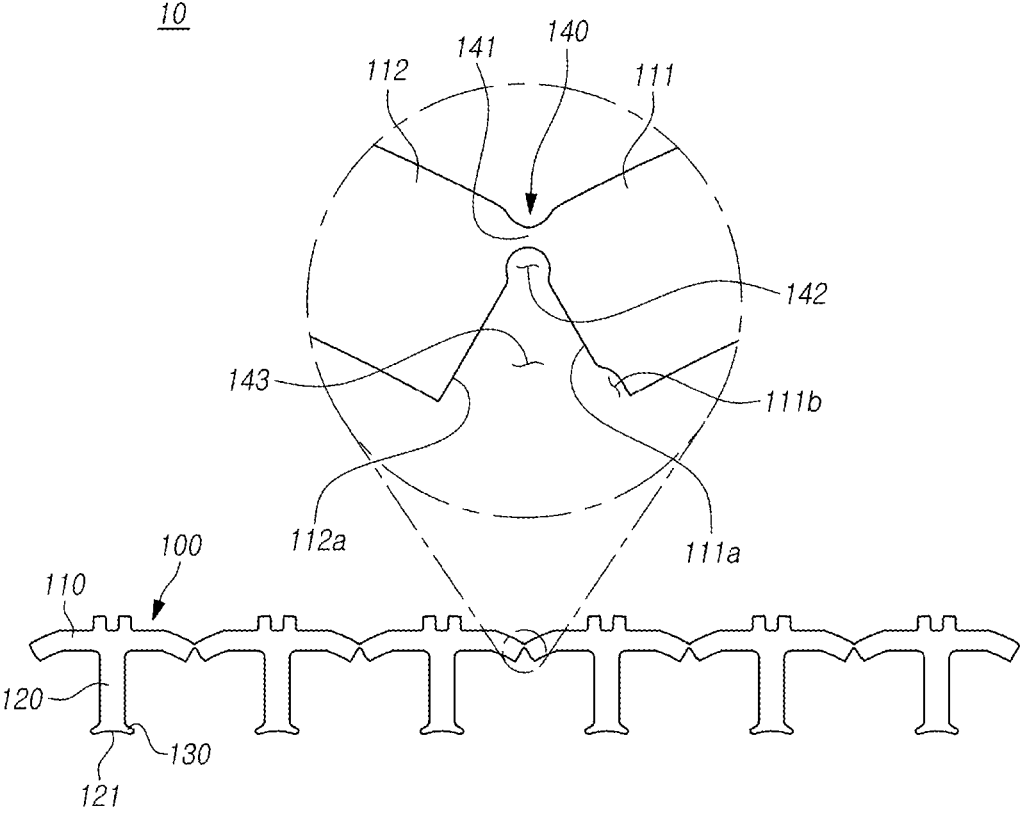
FIG. 2 is a plan view of a stator before bending according to an embodiment of the disclosure.
Figure 3:
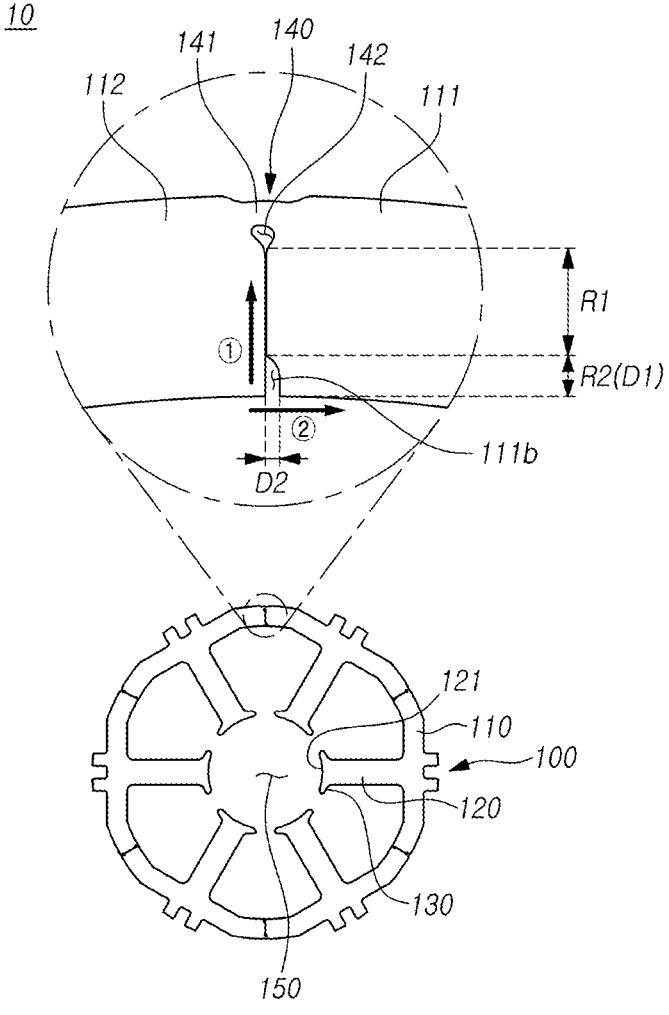
FIG. 3 is a plan view of a stator after bending according to an embodiment of the disclosure.

FIG. 1 is a perspective view of a stator and a rotor according to an embodiment of the disclosure. FIG. 2 is a plan view of a stator before bending according to an embodiment of the disclosure. FIG. 3 is a plan view of a stator after bending according to an embodiment of the disclosure;

Referring to FIGS. 1 to 3, the stator 10 may include a plurality of element stators 100. As can be seen in FIGS. 1 to 3, the plurality of element stators 100 are adjacently arranged. Among the plurality of element stators 100, two neighboring, or adjacent, element stators 100 may have a physically connected structure. Each of the plurality of element stators 100 may include a body portion 110 (e.g., a yoke) or a teeth portion 120. The plurality of element stators 100 may be connected to each other by a bending portion 140. For example, a first body portion included in the first element stator may be connected to a second body portion of a second element stator and a third body portion of a third element stator that are adjacent to each other via the bending portion 140 at both side ends in the circumferential direction.

According to an embodiment, the stator 10 may be made of a plurality of magnetic steel sheets stacked on each other. For example, the stator 10 may be formed in a band shape, as illustrated in FIG. 2. For example, the stator 10 may be formed by bending the bending portion 140 of the band-shaped stator 10 to deform its shape into an annular stator 10 as illustrated in FIG. 3. Hereinafter, the stator 10 formed in the band shape will be referred to as a band-shaped stator 10, and the stator 10 deformed in the annular shape will be referred to as an annular stator 10. Further, as used herein, the circumferential direction and the radial direction may refer to the circumferential direction of the stator 10 and the radial direction of the stator 10, determined based on when the stator 10 is annular. In addition, the circumferential direction may refer to, as a substitute, a vertical straight direction of the radial direction for a fine part such as, e.g., the bending portion.

According to an embodiment, the body portion 110 may be provided with a teeth portion 120. The body portion 110 and the teeth portion 120 may be integrally formed with each other. A width in the circumferential direction ② of the body portion 110 may be greater than a width in the circumferential direction ② of the teeth portion 120. The body portion 110 may be configured of, for example, an outer circumferential side having a curved side as a whole.

According to an embodiment, the teeth portion 120 may be formed to extend from one side of the body portion 110. The teeth portion 120 may be formed to face an inside of the body portion 110, for example, when the stator 10 is annular. The annular stator 10 may form, for example, a hollow portion 150 from the inner side of the front end side 121 of the teeth portion 120. Here, the front end side 121 of the teeth portion 120 refers to a side located opposite to the body portion 110. A rotor 200 may be provide in the hollow portion 150.

According to an embodiment, in the annular stator 10, the teeth portion 120 may be disposed in an annular shape at equal intervals. The stator 10 may include, for example, six teeth portions 120. However, the present disclosure is not limited thereto, and the stator 10 may include three, nine, or twelve teeth portions 120. A slot may be formed between the teeth portions 120 of the neighboring element stators 100. The slot may be formed, for example, to penetrate the stator up and down.

According to an embodiment, a coil connected to an external power source may be wound around the teeth portion 120. For example, the coil may be wound around the teeth 120 using a space of the slot. As another example, in case that the stator 10 is of a relatively small size, it may be difficult to wind the coil using the slot, and therefore, the stator 10 may be bent into the annular shape after winding the coil around the teeth 120 when the stator 10 forms the band shape. The coil wound around the stator 10 may be configured, for example, in a concentrated winding.

According to an embodiment, the front end of the teeth portion 120 may include a teeth protrusion 130 extending to both sides of the circumferential direction ②. For example, the teeth portion 120 may have an inner side protruding to both sides of the circumferential direction ② to face an outer side of the rotor 200. Forming the teeth protrusion 130 on the front end side 121 of the teeth portion 120 may increase an area of the front end side 121 of the teeth portion 120. In other words, a portion of the teeth protrusion 130 may form a portion of the front end side 121 of the teeth portion 120. Accordingly, an area in which the front end side 121 of the teeth portion 120 facing the outer circumferential side of the rotor 200 may be increased due to the teeth protrusion 130. As a result, an interaction between the stator 10 and the rotor 200 by the electromagnetic force may be further increased.

According to an embodiment, the bending portion 140 may include a connecting portion 141, a notch portion 143, or a space 142. The bending portion 140 may be, for example, a portion that is bent when the band-shaped stator 10 is deformed into the annular stator 10. The bending portion 140 may be provided, for example, between sides of the neighboring body portion 110. Here, the sides of the body portion 110 may refer to both end sides in the circumferential direction ②.

According to an embodiment, the connecting portion 141 may be provided such that both ends of the connection portion 141 are connected to sides of the different body portions 110. That is, the connecting portion 141 may be provided such that neighboring body portions 110 connect the sides facing each other. The connecting portion 141 may be located, for example, in an outer side of the radial direction ① on the lateral side of the body portion 110. The connecting portion 141 may be, for example, a portion that is directly bent when the band-shaped stator 10 is deformed into an annular shape. The connecting portion 141 may be, for example, integrally formed with the body portion 110 connected to both ends thereof. The connecting portion 141 may be formed of, for example, a bendable member.

According to an embodiment, the notch portion 143 may refer to a space formed between two adjacent body portions 110. The notch portion 143 may be formed, for example, in a substantially V-shape. The notch portion 143 may be, for example, a space formed by a lateral side (hereinafter, referred to as a first lateral side 111a) of the body portion (hereinafter, referred to as a first body portion 111) connected to one side of the connecting portion 141, and another lateral side (hereinafter, referred to as a second lateral side 112a) of the body portion (hereinafter, referred to as a second body portion 112) connected to the other side of the connecting portion 141. Here, the first body portion 111 and the second body portion 112 may refer to any two neighboring body portions among a plurality of body portions 110. The notch portion 143 may be opened, for example, in a direction opposite to the connecting portion 141. In other words, in between the first lateral side 111a and the second lateral side 112a, the outer side in the radial direction ① may be closed by the connecting portion 141, while the inner side in the radial direction ① may be opened. The notch portion 143 may have, for example, substantially a V-shape as a whole. The band-shaped stator 10 may be deformed into the annular shape by causing the connecting portion 141 to be bended in a direction in which the notch portion 143 is closed. In case where the band-shaped stator 10 is deformed into the annular shape, a portion of the first lateral side 111a and a portion of the second lateral side 112a positioned on both sides of the notch 143 may come into contact with each other.

According to an embodiment, the space 142 is a space formed between the connecting portion 141 and the notch portion 143. The space 142 may remain in a shape of a hole, for example, when the band-shaped stator 10 is deformed into the annular shape. The shape of the space 142 may be a substantially circular shape, but is not limited thereto, and may have a substantially polygonal shape.

According to an embodiment, a recess 111b may be formed in a front end of the first lateral side 111a or a front end of the second lateral side 112a. Here, the front end may refer to an end portion located farthest from the connecting portion 141 in the first lateral side 111a or the second lateral side 112a. In case where the band-shaped stator 10 is bent in the annular shape, the first body portion 111 and the second body portion 112 may not be in contact with each other at the portion where the recess 111b is formed. In other words, a contacting area between the first lateral side 111a and the second lateral side 112a may be reduced owing to the recess 111b.

The stator 10 may determine its natural frequency by adjusting the thickness of the body portion 110 in the radial direction ①. For example, when the thickness of the body portion 110 in the radial direction ① becomes smaller, the natural frequency of the stator 10 becomes lower. For example, when the thickness of the body portion 110 in the radial direction ① becomes larger, the natural frequency of the stator 10 becomes higher. However, there is a disadvantage that when the thickness of the body portion 110 in the radial direction ① is configured to be thinner to determine the natural frequency, magnetic saturation may occur electromagnetically, and there is also a disadvantage that when the thickness of the body portion 110 in the radial direction ① is configured to be thicker, the total weight of the stator 10 may increase. According to the disclosure, it has the effect that the natural frequency of the stator 10 may be lowered by forming the recess 111b in a position where the neighboring body portions 110 are in contact with each other.

Referring to FIG. 3, illustrated are a first section R1 in which the first lateral side 111a and the second lateral side 112a are in contact with each other by bending of the connecting portion 141, and a second section R2 spaced apart by the recess 111b. Here, the length of the second section R2 may be substantially the same as the first length D1 (e.g., length in the radial direction) of the recess 111b. The length of the first section R1 and the length of the second section R2 may be inversely proportional to each other. That is, as the length of the first section R1 increases, the length of the second section R2 may decrease. The second length D2, which is perpendicular to the first length D1 of the recess 111b, may be a distance in which a portion of the first body portion 111 and a portion of the second body portion 112 are spaced apart from each other in the circumferential direction ① for the second section R2. The second length D2 of the recess 111b may be sufficient if the first body portion 111 and the second body portion 112 are not in contact with each other in the second section R2. If the second length D2 becomes longer, an air layer formed between the first body portion 111 and the second body portion 112 may become thicker, thereby resulting in degraded performance of a rotating magnetic field. The natural frequency of the stator 10 may be determined, for example, depending upon the first length D1 (or the length of the second section R2) of the recess 111b. As the length of the second section R2 is increased, the natural frequency of the stator 10 may become lower. That is, when the length of the second section R2 increases and thus the area where the first lateral side 111a and the second lateral side 112a come into contact with each other decreases, the same effect as reducing the thickness of the body portion 110 in the radial direction ① may occur.

Figure 12:
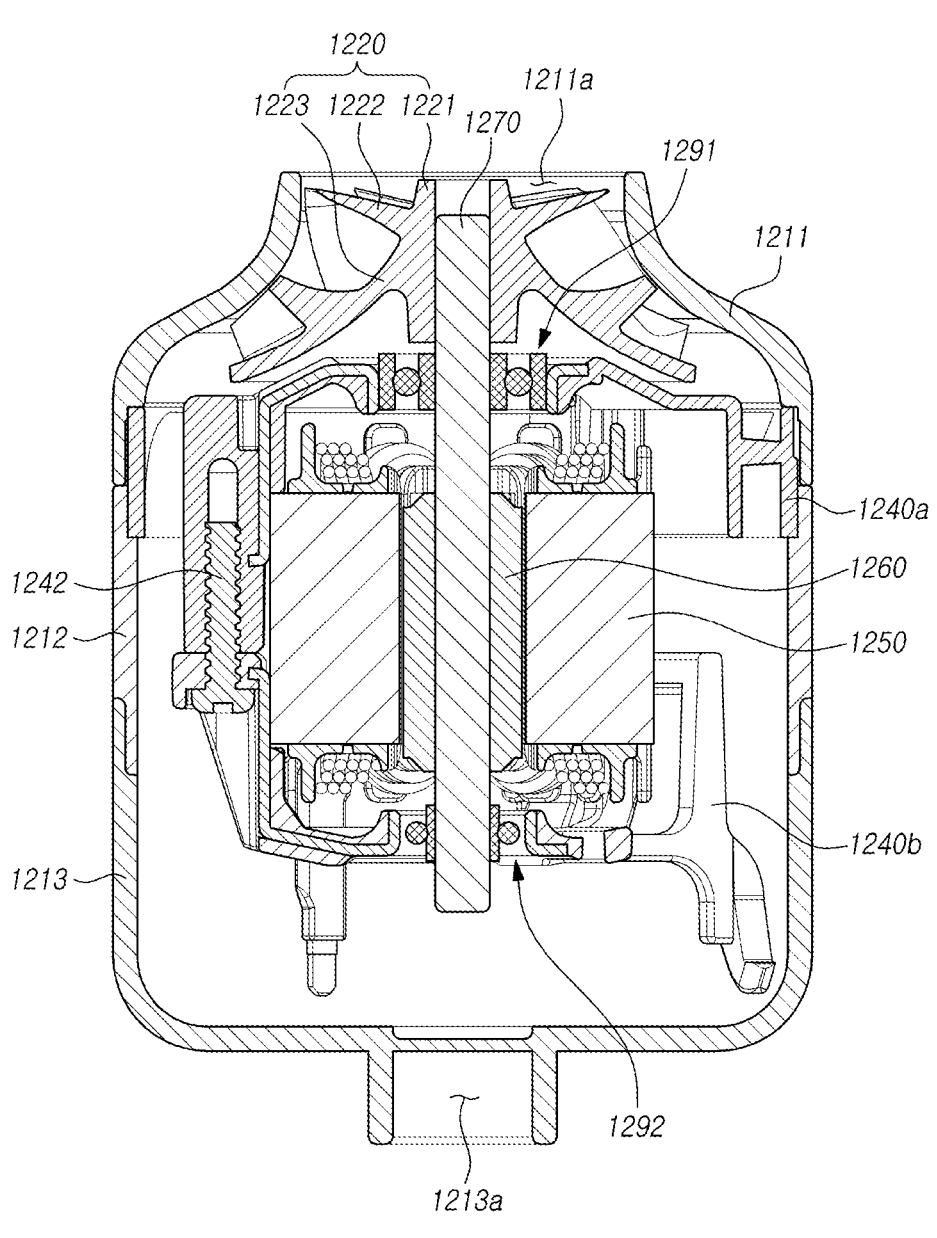
FIG. 12 is a cross-sectional view taken along a plane B-B of FIG. 10.

According to an embodiment, the rotor 200 may be disposed in a hollow portion formed inside the stator 10 to rotate about a rotation shaft (e.g., a rotation shaft 1270 of FIG. 12). The front end sides 121 of a plurality of teeth portions 120 arranged in the annular shape inside the stator 10 may provide for partition of the hollow portion 150 through which the rotor 200 may rotate. The rotor 200 may be inserted into the hollow portion 150 of the stator 10 and have an outer circumferential side to face the front end side 121 of the teeth portion 120. An air gap for rotation of the rotor 200 may be formed between the front end sides 121 of the plurality of teeth portions 120 and the outer circumferential side of the rotor 200. The rotor 200 may be disposed, for example, to have an air gap at the same interval from each of the teeth portions 120.

According to an embodiment, the rotor 200 may include a rotation shaft insert hole 210. For example, a rotation shaft (e.g., the rotation shaft 1270 of FIG. 12) may be press-fitted and fixed to the rotation shaft insert hole 210. The rotor 200 may have, for example, a cylindrical shape that rotates about the rotation shaft (e.g., the rotation shaft 1270 of FIG. 12), but the disclosure is not limited thereto.

According to an embodiment, a plurality of permanent magnets may be inserted into the rotor 200. The permanent magnets accommodated in the rotor 200 may electromagnetically interact with a rotating magnetic field formed when a current is applied to the stator 10. In other words, the permanent magnets form a repulsive force and an attractive force with the stator 10, thereby causing the rotor 200 to rotate. The permanent magnets may be, for example, rare earth-based magnets. The number of poles of the permanent magnets may be 2 poles, 4 poles, or 8 poles, but is not limited thereto.

When a current is applied to the coil wound on the teeth portion 120 of the stator 10, the polarity of each coil may be sequentially changed, and a rotating magnetic field may be generated in the teeth portion 120. Further, a magnetic field may be formed in the rotor 200 by the permanent magnet. Accordingly, the rotational force is applied to the rotor 200, by the repulsive force generated when the polarity of the rotating magnetic field generated in the teeth portion 120 is the same as the polarity of the permanent magnet, and by the attractive force generated when the polarities are different from each other. As a result, the rotor 200 may rotate about the rotation shaft (e.g., the rotation shaft 1270 of FIG. 12).

Figure 4:
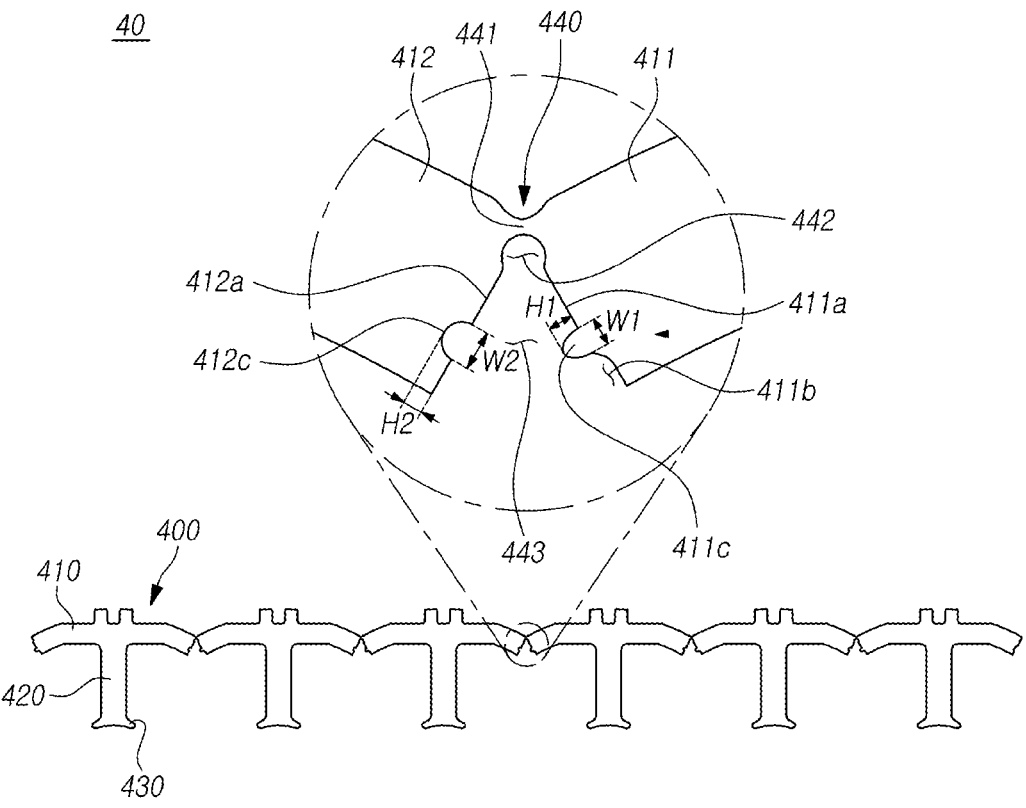
FIG. 4 is a plan view of a stator before bending according to another embodiment of the disclosure.
Figure 5:
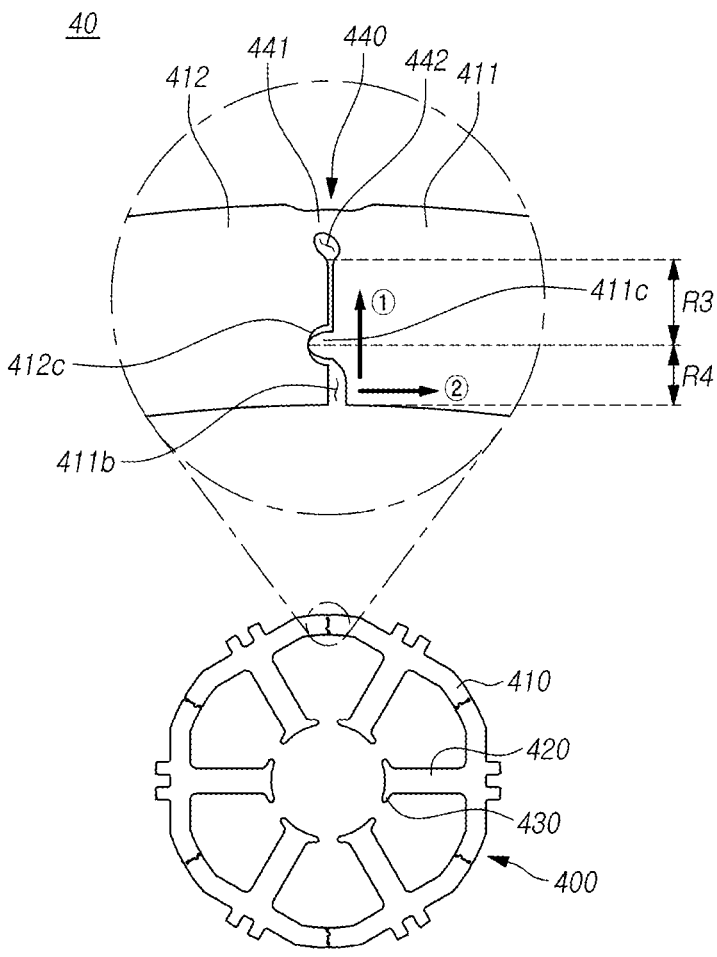
FIG. 5 is a plan view of a stator after bending according to another embodiment of the disclosure.

FIG. 4 is a plan view of a stator before bending of a bending portion according to another embodiment of the disclosure. FIG. 5 is a plan view of a stator after bending of a bending portion according to another embodiment of the disclosure.

Referring to FIGS. 4 and 5, the stator 40 may include a plurality of element stators 400 or a bending portion 440. The configuration of the plurality of element stators 400 or the bending portion 440 may be partially or entirely the same as the configuration of the plurality of element stators 100 or the bending portion 140 of FIGS. 1 to 3. Each of the plurality of element stators 400 may include a body portion 410 (e.g., a yoke) or a teeth portion 420.

In the following description, a third body portion 411 and a fourth body portion 412 refer to any two neighboring body portions among the plurality of body portions 410. The third body portion 411 may include a third lateral side 411a, which is one lateral side in the circumferential direction ②, and the fourth body portion 412 may include a fourth lateral side 412a that faces the third lateral side 411a. According to an embodiment, a recess 411b may be formed at a front end of the third lateral side 411a or a front end of the fourth lateral side 412a. Descriptions of configurations overlapping those described with reference to FIGS. 1 to 3 will be omitted.

According to an embodiment, the third lateral side 411a may include a contact protrusion 411c. The contact protrusion 411c may be formed to protrude, for example, between the connecting portion 441 and the front end of the third lateral side 411a. According to an embodiment, the fourth lateral side 412a may include a contact recess 412c. The contact recess 412c may be formed, for example, such that the contact protrusion 411c is inserted between the connecting portion 441 and the front end of the fourth lateral side 412a. Conversely, the third lateral side 411a may include the contact recess 412c, and the fourth lateral side 412a may include the contact protrusion 411c.

In case that the connecting portion 441 is bent and the band-shaped stator 40 is deformed into the annular shape, a portion of the contact protrusion 411c and a portion of the contact recess 412c may be in contact with each other. In this case, a portion between the contact protrusion 411c and a space 442 of the third lateral side 411a and a portion between the contact recess 412c and the space 442 of the fourth lateral side 412a may be in contact with each other or may be spaced apart from each other.

According to an embodiment, a length H1 of the contact protrusion 411c protruding in the direction perpendicular to the third lateral side 411a may be longer than a length H2 of the contact recess 412c recessed in the direction perpendicular to the fourth lateral side 412a. That is, the contact protrusion 411c and the contact recess 412c may have shapes that do not correspond to each other. The contact protrusion 411c and the contact recess 412c may have, for example, a semicircular shape, but may have semicircular shapes with different radiuses. Accordingly, when the connecting portion 441 is bent, the third lateral side 411a and the fourth lateral side 412a may not be in contact with each other in portions other than the contact protrusion 411c and the contact recess 412c. The stator 40 is typically manufactured by stacking a plurality of magnetic steel sheets, wherein the third lateral side 411a and the fourth lateral side 412a are not flat, thereby resulting in irregularities in a contact side of the third lateral side 411a and the fourth lateral side 412a for each stator 40 manufactured, which may make it difficult to maintain the natural frequency characteristics within a predetermined range. Accordingly, in order to manufacture a plurality of stators 40 having a constant natural frequency value, the size of the contact protrusion 411c and the contact recess 412c may be adjusted to minimize the contact area between the third lateral side 411a and the fourth lateral side 412a.

According to an embodiment, a length W1 in the radial direction ①of a cross section of the contact protrusion 411c on the third lateral side 411a may be less than a length W2 in the radial direction ① of a cross section of the contact recess 412c on the fourth lateral side 412a. Accordingly, the contact area between the contact protrusion 411c and the contact recess 412c may be minimized.

Referring to FIG. 5, illustrated are a third section R3 which is a section between a portion where the contact protrusion 411c and the contact recess 412c come into contact with each other and the space 442, and a fourth section R4 which is a section between a portion where the contact protrusion 411c and the contact recess 412c are in contact with each other and a front end of the third lateral side 411a, by bending of the connecting portion 441. The third section R3 may be, for example, a sum of a section in which the third lateral side 411a and the fourth lateral side 412a face (contact) each other with a certain distance spaced apart from each other, and a partial section of a portion space apart between the contact protrusion 411c and the contact recess 412c. That is, the fourth section R4 may be, for example, a sum of a length of the recess 411b in the radial direction ① and a partial length of the portion spaced apart between the contact protrusion 411c and the contact recess 412c. In other words, the fourth section R4 may include a section spaced apart by the recess 411b. The length of the third section R3 and the length of the fourth section R4 may be inversely proportional to each other. That is, as the length of the third section R3 increases, the length of the fourth section R4 may decrease. The natural frequency of the stator 40 may be determined, for example, depending upon the length of the fourth section R4. When the length of the fourth section R4 increases, the natural frequency of the stator 40 may decrease.

FIGS. 6A to 6E are enlarged views illustrating a bending portion of a stator according to various embodiments of the disclosure. FIG. 7 is a graph illustrating the natural frequencies of FIGS. 6A to 6E.

Referring to FIGS. 6A to 6E, the stator 40 may include a plurality of element stators 400 or a bending portion 440. The configuration of the plurality of component stators 400 or the bending portion 440 as illustrated may be partially or entirely the same as the configuration of the plurality of component stators 100 or 400 or the bending portion 140 or 440 of FIGS. 1 to 5. FIGS. 6A to 6E are diagrams for describing a change in natural frequency according to a difference in length between the third section R3 and the fourth section R4 with respect to the stator 40 illustrated in FIGS. 4 and 5, but the following description may also be applied to the stator 10 illustrated in FIGS. 1 to 3. That is, the third section R3 of FIG. 5 may correspond to the first section R1 of FIG. 3, and the fourth section R4 of FIG. 5 may correspond to the second section R2 of FIG. 3.

Figure 6A:
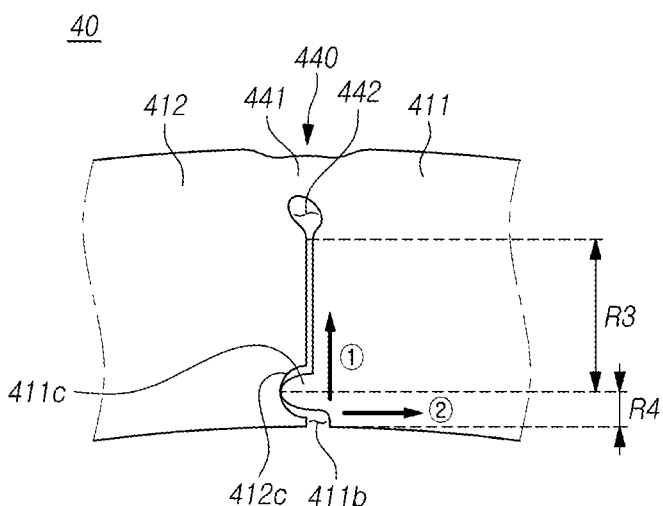
FIGS. 6A to 6E are enlarged views illustrating a bending portion of a stator according to various embodiments of the disclosure.
Figure 6B:
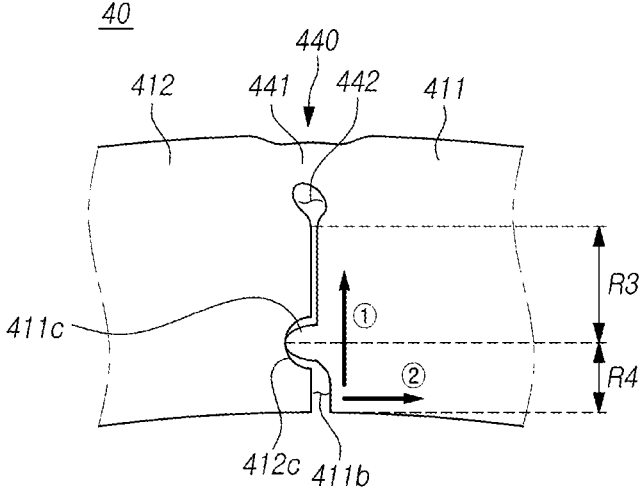
Figure 6C:
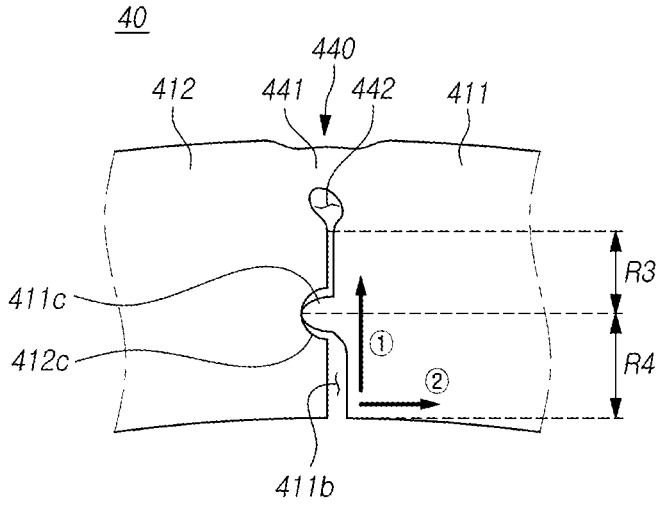
Figure 6D:
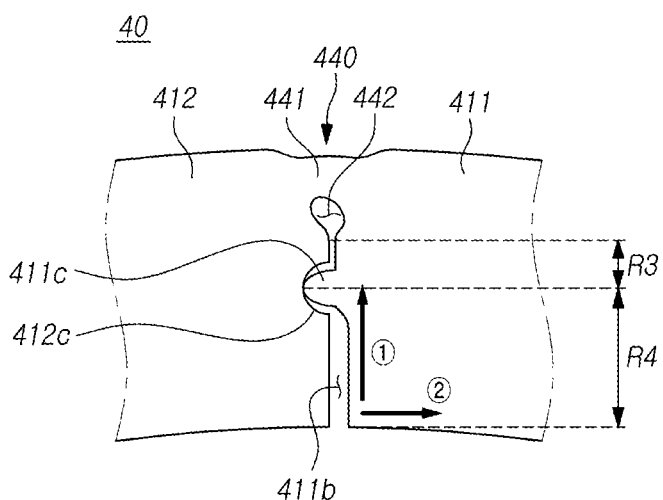
Figure 6E:
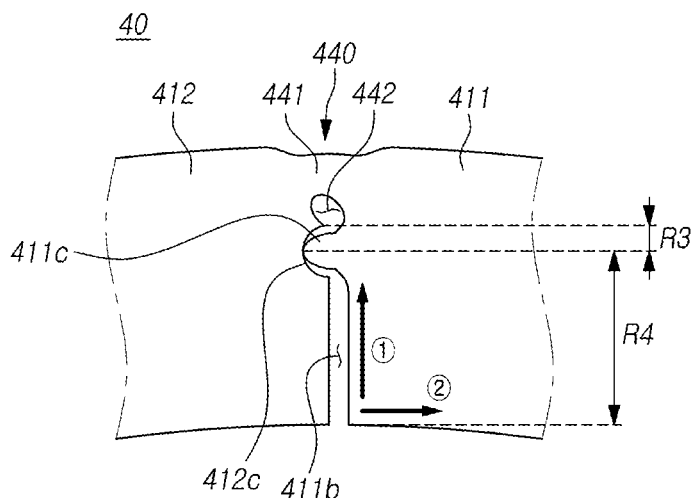
Figure 7:
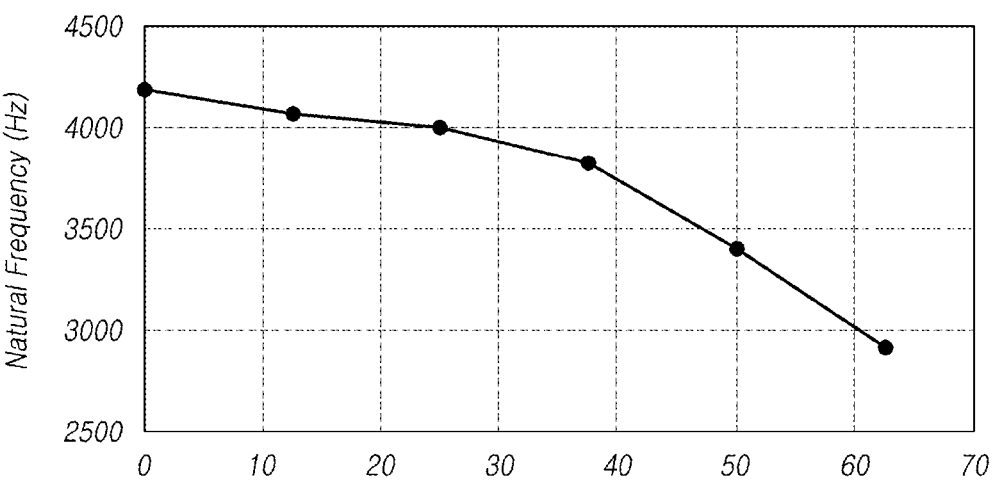
FIG. 7 is a graph representing the natural frequency of FIGS. 6A to 6E.

The proportion (occupied by) of the fourth section R4 with respect to the thickness of the body portion 410 in the radial direction ① may be, for example, 12.5% in the stator 40 illustrated in FIG. 6A, 25% in the stator 40 illustrated in FIG. 6B, 37.5% in the stator 40 illustrated in FIG. 6C, 50% in the stator 40 illustrated in FIG. 6D, or 62.5% in the stator 40 illustrated in FIG. 6E. As such, the length of the fourth section R4 may be determined by varying the positions of the contact protrusion 411c and the contact recess 412c in the third lateral side 411a of the third body portion 411 and the fourth lateral side 412a of the fourth body portion 412. The contact protrusion 411c and the contact recess 412c may be located, for example, closer to the connecting portion 441 or the space 442, as the proportion occupied by the fourth section R4 further increases. As the length of the fourth section R4 increases, the length of the recess 411b in the radial direction ① may also increase.

Referring to the graph of FIG. 7, it may be seen that the natural frequency of the stator 40 decreases as the length of the fourth section R4 increases. In the graph of FIG. 7, the x-axis is a proportion (hereinafter, referred to as a first proportion) of the length of the fourth section R4 to the radial thickness of the body portion 410, and the y-axis is a natural frequency of the stator 40. The natural frequency of the stator 40 may decrease non-linearly according to the length of the fourth section R4. The amount of change in the natural frequency of the stator 40 according to the first proportion may have, for example, the form of a quadratic function. In the range of the first proportion being 0% to 25%, the amount of change in the natural frequency of the stator 40 may not be so large. On the other hand, when the first proportion is 25% or more, the amount of change in the natural frequency of the stator 40 may be significantly increased. Therefore, when determining the natural frequency of the stator 40, it may be desirable to determine the natural frequency in a range in which the first proportion is 25% or more. However, the first proportion may not be configured to be greater than or equal to a certain percentage due to the proportion occupied by the connecting portion 441 and the space 442. The first proportion of the fourth section R4 may be, for example, a maximum of about 62.5%, but is not limited thereto, and may vary depending on the proportion occupied by the connecting portion 441 and the space 442.

Figure 8A:
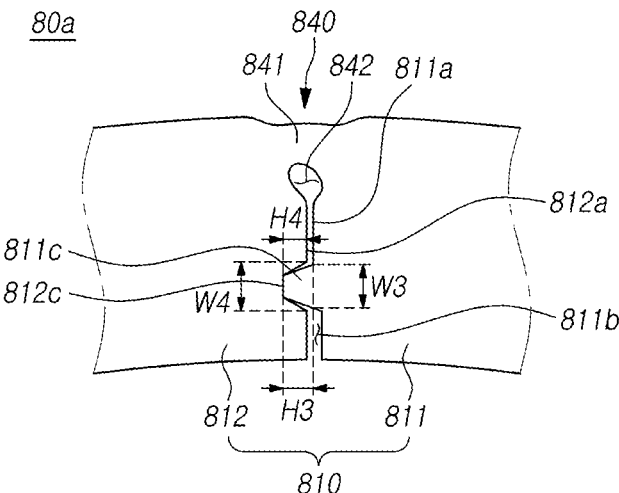
FIGS. 8A and 8B are enlarged views illustrating a contact protrusion and a contact recess according to various embodiments of the disclosure.
Figure 8B:
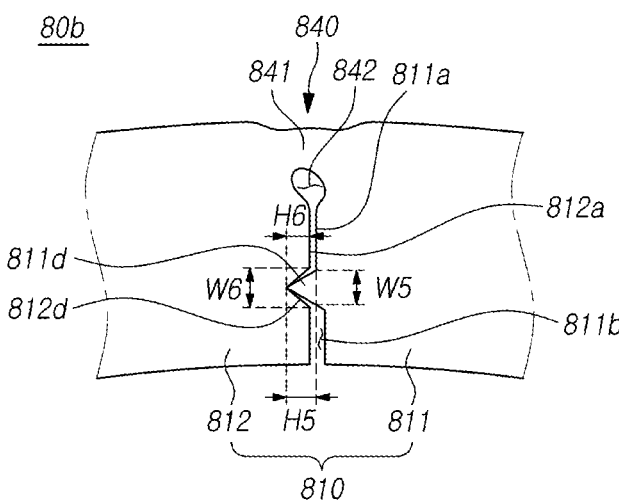

FIGS. 8A and 8B are enlarged views illustrating a contact protrusion and a contact recess according to various embodiments of the disclosure.

Referring to FIGS. 8A to 8B, the stator 80*a* or 80*b* may include a plurality of body portions 810, a bending portion 840, a contact protrusion (e.g., a second contact protrusion 811*c* or a third contact protrusion 811*d*), or a contact recess (e.g., a second contact recess 812*c* or a third contact recess 812*d*). The configuration of the plurality of body portions 810, the bending portion 840, the contact protrusion (e.g., the second contact protrusion 811*c* or the third contact protrusion 811*d*), or the contact recess (e.g., the second contact recess 812*c* or the third contact recess 812*d*), as illustrated, may be partially or entirely the same as the configuration of the plurality of body portions 410, the bending portion 440, the contact protrusion 411*c*, or the contact recess 412*c* of FIGS. 4 and 5.

According to an embodiment, the second contact protrusion 811*c* may protrude in a substantially rectangular shape, and the second contact recess 812*c* may also be recessed in a substantially rectangular shape. The second contact protrusion 811*c* may have, for example, a trapezoidal shape whose width decreases as it goes away from the third lateral side 811*a*. The second contact recess 812*c* may have, for example, a trapezoidal shape whose width decreases as it is further recessed from the fourth lateral side 812*a*. For example, a length H3 of the second contact protrusion 811*c* protruding in a direction perpendicular to the third lateral side 811*a* may be longer than a length H4 of the second contact recess 812*c* recessed in a direction perpendicular to the fourth lateral side 812*a*. That is, the second contact protrusion 811*c* and the second contact recess 812*c* may have shapes that do not correspond to each other. For example, a radial length W3 of a cross section of the second contact protrusion 811*c* on the third lateral side 811*a* may be shorter than a radial length W4 of a cross section of the second contact recess 812*c* on the fourth lateral side 812*a*.

According to an embodiment, the third contact protrusion 811*d* may protrude in a substantially triangular shape, and the third contact recess 812*d* may also be recessed in a substantially triangular shape. A length H5 of the third contact protrusion 811*d* protruding in a direction perpendicular to the third lateral side 811*a* may be, for example, larger than a length H6 of the third contact recess 812*d* recessed in the direction perpendicular to the fourth lateral side 812*a*. A radial length W5 of a cross section of the third contact protrusion 811*d* on the third lateral side 811*a* may be, for example, shorter than a radial length W6 of a cross section of the third contact recess 812*d* on the fourth lateral side 812*a*.

Figure 9:
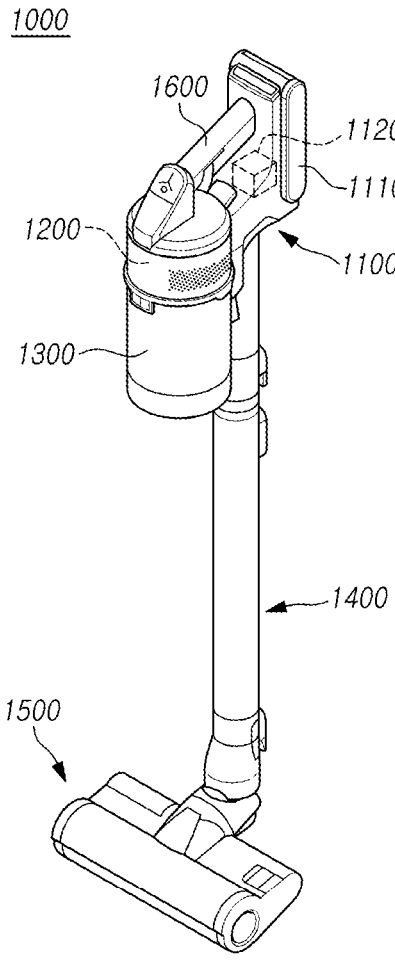
FIG. 9 is a perspective view of a vacuum cleaner according to an embodiment of the disclosure.

FIG. 9 is a perspective view of a vacuum cleaner according to an embodiment of the disclosure.

Referring to FIG. 9, the vacuum cleaner 1000 may include a cleaner main body 1100, a suction motor 1200, a dust collector 1300, a handle 1600, a stick 1400, a suction head 1500, a battery 1110, or a controller 1120. The suction motor 1200 may be applied to various home appliances other than the vacuum cleaner 1000. Hereinafter, description will be made of the vacuum cleaner 1000 including the suction motor 1200. The vacuum cleaner 1000 illustrated above may include any one of the stators according to various embodiments described with reference to FIGS. 1 to 8*b*.

According to an embodiment, the suction motor 1200, the battery 1110, or the controller 1120 may be accommodated in the cleaner main body 1100. For example, the suction motor 1200 may generate power to produce a suction force inside the cleaner main body 1100. The battery 1110 may supply, for example, power to the suction motor 1200. The controller 1120 may control, for example, driving of the suction motor 1200. In other words, the controller 1120 may adjust a driving strength of the suction motor 1200 according to a user input.

According to an embodiment, the cleaner main body 1100 may be connected to the suction head 1500 by the stick 1400. The stick 1400 may have a hollow cylindrical shape, but the disclosure is not limited thereto. The dust collector 1300 for collecting foreign substances may be provided inside or around the cleaner main body 1100. For example, while the suction motor 1200 is driven, the vacuum cleaner 1000 may suck foreign substances on a surface to be cleaned in contact with the suction head 1500. The sucked foreign substances may pass through the stick 1400 and be collected in the dust collector 1300. The handle 1600 provided to be gripped by a user to manipulate the vacuum cleaner 1000 may be coupled to the cleaner main body 1100.

Figure 10:
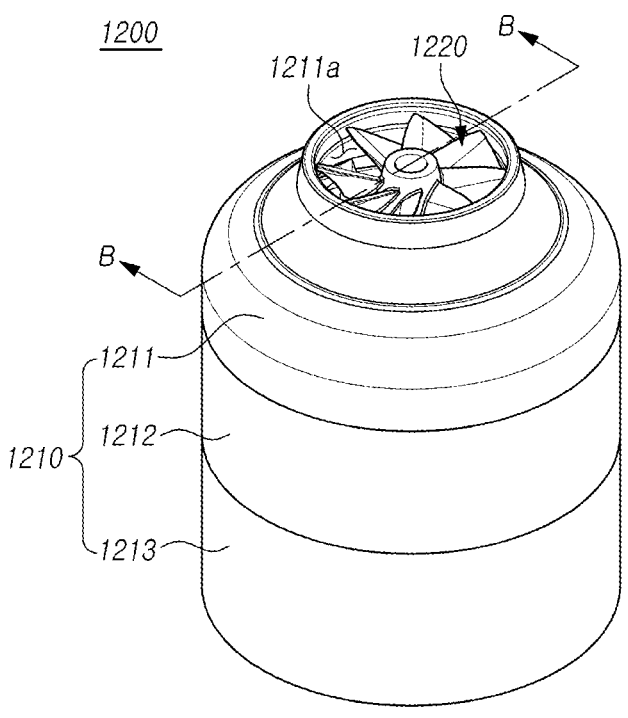
FIG. 10 is a perspective view of a suction motor according to an embodiment of the disclosure.
Figure 11:
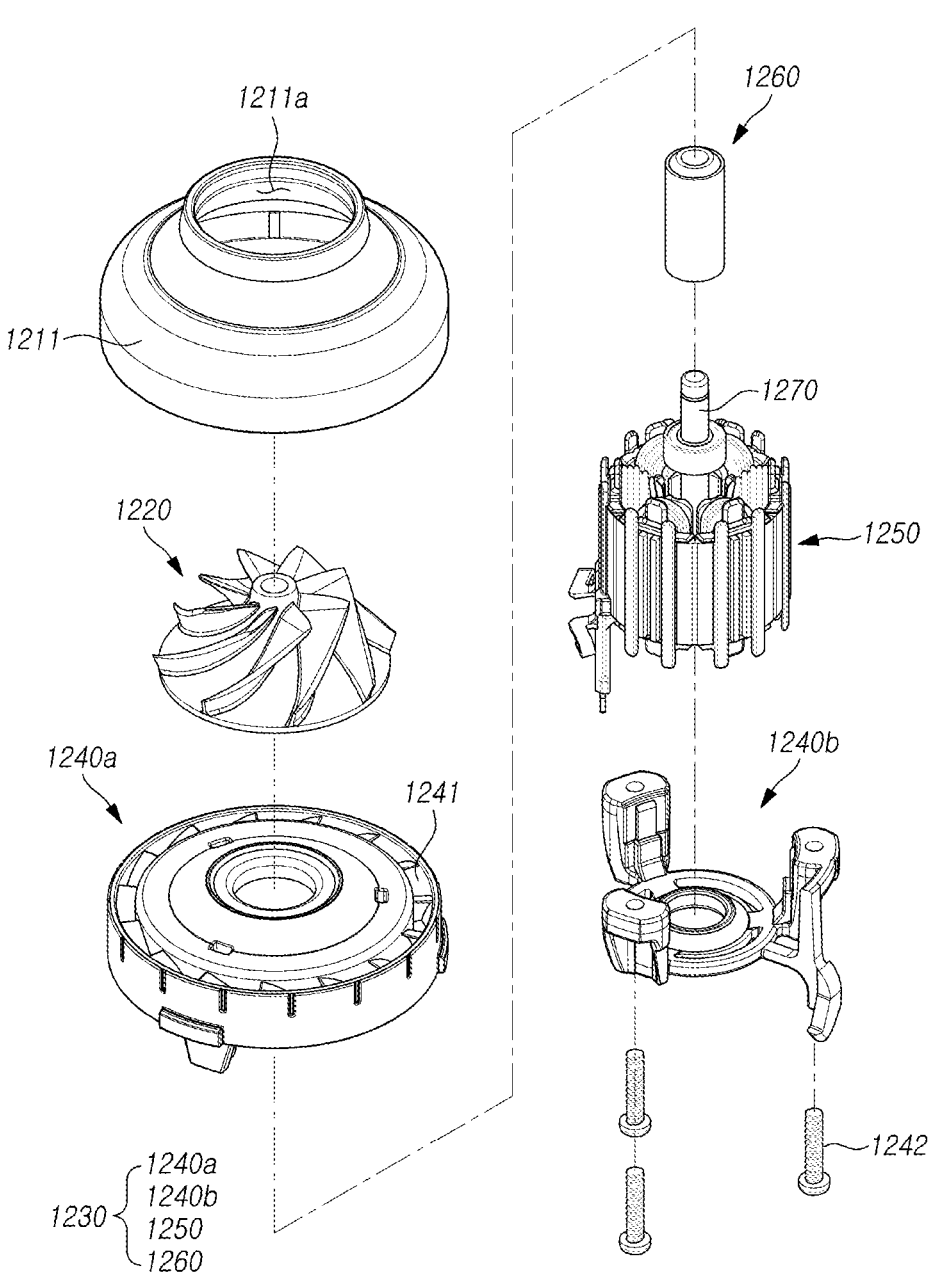
FIG. 11 is an exploded perspective view of a suction motor according to an embodiment of the disclosure.

FIG. 10 is a perspective view of a suction motor according to an embodiment of the disclosure. FIG. 11 is an exploded perspective view of a suction motor according to an embodiment of the disclosure. FIG. 12 is a cross-sectional view of a suction motor taken along a plane B-B of FIG. 10.

Referring to FIGS. 10 to 12, the suction motor 1200 may include a housing 1210, a motor module 1230, an impeller 1220, a diffuser 1241, or a rotation shaft 1270. The suction motor 1200 illustrated may be entirely or partially the same as the suction motor 1200 of FIG. 9. The stator 1250 and the rotor 1260 of the illustrated suction motor 1200 may include any one of those according to various embodiments described with reference to FIGS. 1 to 8*b*. Hereinafter, any portions of the description of the stator 1250 and the rotor 1260 that are redundant with the description of FIGS. 1 to 8*b* will be omitted.

According to an embodiment, the suction motor 1200 may be provided with the housing 1210 and the motor module 1230 installed inside the housing 1210 to generate a suction force.

According to an embodiment, the housing 1210 may include a first housing 1211, a second housing 1212 coupled to the first housing 1211, and a third housing 1213 coupled to the second housing 1212. The housing 1210 may be provided to have a substantially cylindrical shape, but the disclosure is not limited thereto and may include various shapes. The first housing 1211 and the second housing 1212 may be provided, for example, to be detachable in the axial direction of the rotation shaft 1270. The second housing 1212 and the third housing 1213 may be provided, for example, to be detachable in the axial direction of the rotation shaft 1270. The first housing 1211 may include, for example, an inlet 1211*a* provided to allow air to flow in by the motor module 1230 to enter into the housing 1210. The third housing 1213 may include, for example, an outlet 1213*a* provided to allow the air introduced into the housing 1210 through the inlet 1211*a* to be discharged out. The first housing 1211, the second housing 1212, and the third housing may be coupled together to form an air flow path from the inlet 1211*a* to the outlet 1213*a*. The housing 1210 may form, for example, an inner space in which components such as the motor module 1230, the impeller 1220, and the diffuser 1241 may be disposed.

According to an embodiment, the impeller 1220 may include a hub 1223, a shaft coupling member 1221, or a plurality of wings 1222. The impeller 1220 may be located, for example, inside the inlet 1211*a* of the first housing 1211. The impeller 1220 may be, for example, coupled to a portion of the rotation shaft 1270 of the motor module 1230 by the shaft coupling member 1221. By coupling of the shaft coupling member 1221 and the rotation shaft 1270, the impeller 1220 may rotate together with rotation of the rotor 1260. The shaft coupling member 1221 may be positioned, for example, at an upper end of the hub 1223. The hub 1223 may, for example, guide air introduced through the inlet 1211*a*. The hub 1223 may be, for example, formed to have a wider radius as the distance from the inlet 1211*a* increases, so that the introduced air is discharged in the radial direction of the rotation shaft 1270. The plurality of wings 1222 may be provided, for example, on an outer side (or an upper side) of the hub 1223. The plurality of wings 1222 may be provided to form an airflow when the impeller 1220 rotates by the rotor 1260.

According to an embodiment, the diffuser 1241 may be located in the housing 1210 (e.g., the second housing 1212). The diffuser 1241 may be provided, for example, in a cylindrical shape along an inner circumferential side of the housing 1210 (e.g., the second housing 1212). The diffuser 1241 may be, for example, formed of a plurality of ribs. The diffuser 1241 may be, for example, formed to increase the pressure of the air while guiding the air discharged by the impeller 1220.

According to an embodiment, the motor module 1230 may include motor frames 1240*a* and 1240*b*, a stator 1250, and a rotor 1260. The motor module 1230 may be provided in an inner space of the housing 1210.

According to an embodiment, the motor frames 1240*a* and 1240*b* may include upper motor frames 1240*a* and 1240*b* and lower motor frames 1240*a* and 1240*b*. The upper motor frames 1240*a* and 1240*b* and the lower motor frames 1240*a* and 1240*b* may be coupled to each other with the stator 1250 and the rotor 1260 interposed therebetween. That is, the stator 1250 and the rotor 1260 may be positioned inside the motor frames 1240*a* and 1240*b*. The upper motor frames 1240*a* and 1240*b* and the lower motor frames 1240*a* and 1240*b* may be coupled by means of a coupling member 1242. The coupling member 1242 may include a screw. The motor frames 1240*a* and 1240*b* (e.g., the upper motor frames 1240*a* and 1240*b*) may be positioned below the impeller 1220. The motor frames 1240*a* and 1240*b* (e.g., the upper motor frames 1240*a* and 1240*b*) may be positioned such that an outer circumferential side thereof is adjacent to an inner circumferential side of the diffuser 1241. That is, the diffuser 1241 may be positioned between the second housing 1212 and the motor frames 1240*a* and 1240*b*.

According to an embodiment, the stator 1250 may have a cylindrical shape with a hollow portion formed therein. The rotor 1260 may be positioned in the hollow portion of the stator 1250. The stator 1250 and the rotor 1260 may be provided to electromagnetically interact with each other when a current is applied.

According to an embodiment, the rotation shaft 1270 may be provided to pass through a rotation shaft insert hole of the rotor 1260. For example, the impeller 1220 may be coupled to an end of the rotation shaft 1270 adjacent to the inlet 1211*a*. Accordingly, the rotation shaft 1270 may transmit a rotatory force of the rotor 1260 to the impeller 1220. A first bearing 1291 and a second bearing 1292 may be disposed onto the rotation shaft 1270, for rotations. The first bearing 1291 may be disposed, for example, to surround an outer circumferential side of the rotation shaft 1270 above the motor frames 1240*a* and 1240*b*. More specifically, the first bearing 1291 may be disposed between the motor frames 1240*a* and 1240*b* and the impeller 1220. The second bearing 1292 may be disposed, for example, to surround the outer circumferential side of the rotation shaft 1270 underneath the motor frames 1240*a* and 1240*b*.

Figure 13:
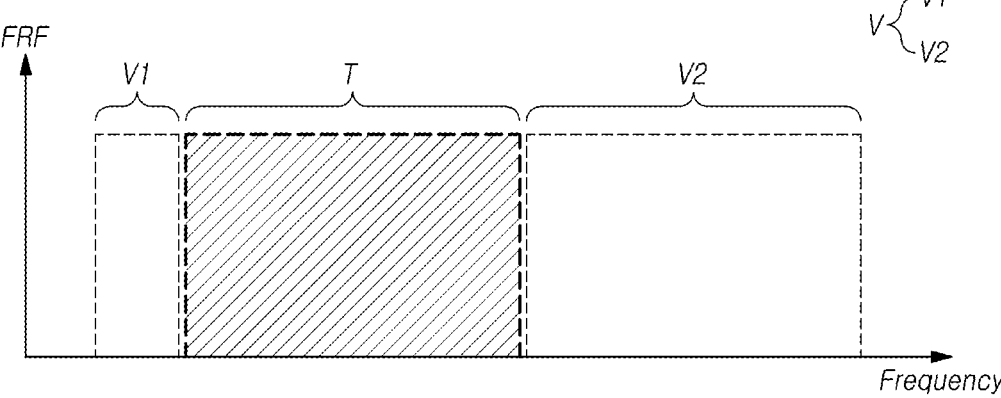
FIG. 13 is a graph representing a frequency domain according to an operation of a vacuum cleaner.

FIG. 13 is a graph representing a frequency domain according to an operation of a vacuum cleaner.

Referring to FIG. 13, a vibration region V of the vacuum cleaner are illustrated. The vacuum cleaner 1000 may perform multiple operation steps according to a suction strength. Specifically, the controller 1120 of the vacuum cleaner 1000 may adjust the rotational speed of the rotor 1260 of the suction motor 1200 according to the suction strength. As the suction strength of the vacuum cleaner 1000 increases, the frequency generated by the vacuum cleaner 1000 may increase.

The vibration region V may be divided into a first vibration region V1 and a second vibration region V2. The first vibration region V1 may be a vibration region corresponding to the rotational speed of the rotor 1260. In the rotor 1260 of the suction motor 1200, a frequency in the first vibration region V1 may be generated according to the suction intensity. The second vibration region V2 may be a vibration region that varies depending upon the number of poles of the permanent magnets in the motor module 1230. For example, when the number of poles of the permanent magnets in the motor module 1230 is four poles, the second vibration region V2 may be a vibration region corresponding to four times the frequency range of the first vibration region V1. Further, the frequency generated by the number of poles of the permanent magnets may be generated to be four times greater than the frequency generated by the rotation of the rotor 1260 (for example, for four poles). Accordingly, the range of the second vibration region V2 may be four times wider than the range of the first vibration region V1. The vacuum cleaner 1000 according to an embodiment of the disclosure may be designed such that the natural frequency of the stator 1250 of the motor module 1230 has a frequency region (e.g., a target region T) other than the first vibration region V1 and the second vibration region V2, to minimize noise due to the operation. For example, the stator 1250 can be designed such that in the stator according to FIGS. 1 to 8*b* the natural frequency has a value that falls between the first vibration region V1 and the second vibration region V2.

Heretofore, certain embodiments have been illustrated and described. However, the disclosure is not limited to the above-described embodiments, and it is to be understood by those of ordinary skill in the art that various changes in form and details may be made therein without departing from the spirit and scope of the disclosure as defined by the following claims.

The invention claimed is:

1. A stator that is formable in a band shape or an annular shape, the stator comprising:

a plurality of element stators adjacently arranged, each element stator of the plurality of element stators including a teeth portion and a body portion disposed at one end of the teeth portion; and a plurality of connecting portions, wherein, for adjacent element stators of the plurality of element stators, a respective connecting portion of the plurality of connecting portions connects a first lateral side of a first body portion of a first element stator of the adjacent element stators and a second lateral side of a second body portion of a second element stator of the adjacent element stators, and, a recess is formed at a front end of the first lateral side or a front end of the second lateral side, wherein the first lateral side includes a contact protrusion protruding between the respective connecting portion and the front end of the first lateral side, the second lateral side includes a contact recess allowing the contact protrusion to be inserted into a position corresponding to the contact protrusion, a length of the contact protrusion protruding in a direction perpendicular to the first lateral side is longer than a length of the contact recess recessed in a direction perpendicular to the second lateral side, and when the respective connecting portion is bent such that the first lateral side and the second lateral side face each other, the contact protrusion is in contact with the contact recess such that the first lateral side is spaced apart from the second lateral side.

2. The stator of claim 1, wherein, when the stator is formed in the annular shape, the respective connecting portion is bent such that the first lateral side and the second lateral side face each other, and the teeth portion of each element stator faces inwardly.

3. The stator of claim 1, wherein in case that the respective connecting portion is bent such that the first lateral side and the second lateral side face each other to form the stator in the annular shape, a radial depth of the recess is greater than 25% of a radial width of the first body portion or the second body portion.

4. The stator of claim 1, wherein a radial length of a cross section of the contact protrusion on the first lateral side is shorter than a radial length of a cross section of the contact recess on the second lateral side.

5. The stator of claim 1, wherein in case that the respective connecting portion is bent such that the first lateral side and the second lateral side face each other to form the stator in the annular shape, a length between a portion where the contact protrusion comes into contact with the contact recess and the front end of the first lateral side or the second lateral side is greater than 25% of a radial width of the first body portion or the second body portion.

6. A suction motor, comprising:

a stator having an annular shape and including:

a plurality of element stators adjacently arranged, each element stator of the plurality of element stators includ-ing a teeth portion and a body portion disposed at one end of the teeth portion, and a plurality of connecting portions, wherein, for adjacent element stators of the plurality of element stators, a respective connecting portion of the plurality of connecting portions connects a first lateral side of a first body portion of a first element stator of the adjacent element stators and a second lateral side of a second body portion of a second element stator of the adjacent element stators, and, a recess is formed at a front end of the first lateral side or a front end of the second lateral side;

a rotor rotatably disposed in the stator with the teeth portion of each element stator of the plurality of element stators protruding toward the rotor;

a rotation shaft passing through a rotation axis of the rotor so as to be rotatable together with the rotor; and an impeller connected to the rotation shaft, wherein the first lateral side includes a contact protrusion protruding between the respective connecting portion and the front end of the first lateral side, the second lateral side includes a contact recess allowing the contact protrusion to be inserted into a position corresponding to the contact protrusion, a length of the contact protrusion protruding in a direction perpendicular to the first lateral side is longer than a length of the contact recess recessed in a direction perpendicular to the second lateral side, and when the respective connecting portion is bent such that the first lateral side and the second lateral side face each other, the contact protrusion is in contact with the contact recess such that the first lateral side is spaced apart from the second lateral side.

7. The suction motor of claim 6, wherein the respective connecting portion is bent such that the first lateral side and the second lateral side face each other, and a radial depth of the recess is greater than 25% of a radial width of the first body portion or the second body portion.

8. The suction motor of claim 6, wherein a radial length of a cross section of the contact protrusion on the first lateral side is shorter than a radial length of a cross section of the contact recess on the second lateral side.

9. The suction motor of claim 6, wherein the respective connecting portion is bent such that the first lateral side and the second lateral side face each other, and a length between a portion where the contact protrusion comes into contact with the contact recess and the front end of the first lateral side or the second lateral side is greater than 25% of a radial width of the first body portion or the second body portion.

10. A vacuum cleaner, comprising:

a cleaner main body;

a suction head configured to suck foreign substances on a surface to be cleaned into the cleaner main body; and a suction motor according to claim 6 disposed inside the cleaner main body.

* * * * *